United States Patent
Iyengar

(10) Patent No.: US 10,437,724 B2
(45) Date of Patent: Oct. 8, 2019

(54) PROVIDING DATA VALUES IN A TIMELY FASHION USING ASYNCHRONOUS DATA STORE OPERATIONS INCLUDING SELECTIVELY RETURNING A VALUE FROM A CACHE OR A VALUE DETERMINED BY AN ASYNCHRONOUS COMPUTATION

(71) Applicant: International Business Machines Corporation, Armonk, NY (US)

(72) Inventor: Arun Iyengar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 15/584,381

(22) Filed: May 2, 2017

(65) Prior Publication Data

US 2018/0322056 A1    Nov. 8, 2018

(51) Int. Cl.
*G06F 12/0813* (2016.01)
*G06F 12/0868* (2016.01)
(Continued)

(52) U.S. Cl.
CPC ...... *G06F 12/0813* (2013.01); *G06F 12/0868* (2013.01); *G06F 12/0893* (2013.01);
(Continued)

(58) Field of Classification Search
CPC .............. G06F 12/0813; G06F 12/084; G06F 12/0868; G06F 12/0893
See application file for complete search history.

(56) References Cited

U.S. PATENT DOCUMENTS 5,734,898 A * 3/1998 He ..................... G06F 9/52
6,112,231 A * 8/2000 DeSimone ........ G06F 17/30902
707/999.01

(Continued)

FOREIGN PATENT DOCUMENTS

WO    2016118979    7/2016

OTHER PUBLICATIONS

"Non-blocking cache with guava and listenable futures (or why I hate ehcache some days)," the Theotherian's blog, Nov. 14, 2013, downloaded from http://www.theotherian.com/2013/11/non-blocking-cache-with-guava-and-listenable-futures.html (downloaded Aug. 3, 2018), 3 pages.*

(Continued)

*Primary Examiner* — Glenn Gossage
(74) *Attorney, Agent, or Firm* — Fleit Gibbons Gutman Bongini Bianco PL; Jose Gutman

(57) ABSTRACT

A processing system server, computer program product, and methods for performing asynchronous data store operations. The server includes a processor which maintains a cache of objects in memory of the server. The processor executes an asynchronous computation to determine the value of an object. In response to receiving a request for the object occurring before the asynchronous computation has determined the value of the object, a value of the object is returned from the cache. In response to receiving a request for the object occurring after the asynchronous computation has determined the value of the object, a value of the object determined by the asynchronous computation is returned. The asynchronous computation may comprise at least one future, such as a ListenableFuture, or a process or thread. The asynchronous computation may determine the value of the object by querying at least one additional server. The asynchronous computation may receive different values from at least two servers, and may return the value received most frequently, or may determine the value of the object based on time stamps.

25 Claims, 5 Drawing Sheets

(51) Int. Cl.
  *G06F 12/0893* (2016.01)
  *G06F 12/084* (2016.01)
(52) U.S. Cl.
  CPC .............. *G06F 2212/1024* (2013.01); *G06F 2212/154* (2013.01); *G06F 2212/163* (2013.01)

(56) References Cited

U.S. PATENT DOCUMENTS

| | | | | |
|---|---|---|---|---|
| 6,567,893 | B1* | 5/2003 | Challenger | G06F 17/30902 707/E17.032 |
| 6,823,514 | B1* | 11/2004 | Degenaro | G06F 12/0842 711/200 |
| 7,756,982 | B2 | 7/2010 | Johnson | |
| 8,868,867 | B2 | 10/2014 | Swanson et al. | |
| 2003/0172236 | A1* | 9/2003 | Iyengar | G06F 12/0811 711/145 |
| 2005/0027869 | A1* | 2/2005 | Johnson | H04L 29/06 709/227 |
| 2009/0055468 | A1* | 2/2009 | Burckart | G06F 16/00 709/203 |
| 2009/0300286 | A1* | 12/2009 | Synge | G06F 17/30457 711/118 |
| 2010/0293335 | A1* | 11/2010 | Muthiah | G06F 12/0813 711/133 |
| 2013/0218953 | A1* | 8/2013 | Bombacino | H04L 67/42 709/203 |
| 2016/0092265 | A1* | 3/2016 | Kogan | G06F 9/4843 718/102 |

OTHER PUBLICATIONS

Oracle, "Interface Future<V>", https://docs.oracle.com/javase/7/docs/api/java/util/concurrent/Future.html, last visited on Oct. 25, 2016, pp. 1-4.

Google, "Interface ListenableFuture<V>", http://google.github.io/guava/releases/snapshot/api/docs/com/google/common/util/concurrent/ListenableFuture.html, last visited on Nov. 1, 2016, pp. 1-3.

Iyengar, A., "Providing Enhanced Functionality for Data Store Clients", Proceedings of the 33rd IEEE International Conference on Data Engineering (ICDE 2017), Apr. 2017, pp. 1-12.

\* cited by examiner

PROVIDING DATA VALUES IN A TIMELY FASHION USING ASYNCHRONOUS DATA STORE OPERATIONS INCLUDING SELECTIVELY RETURNING A VALUE FROM A CACHE OR A VALUE DETERMINED BY AN ASYNCHRONOUS COMPUTATION

BACKGROUND

The present invention generally relates to data caching in computer systems. Data storage can have significant latency. This is particularly true for cloud storage where the latency for fetching and storing data in the cloud can be high due to the fact that the storage server can be remote from the client. A method is needed to reduce the latency of data store operations.

BRIEF SUMMARY

According to various embodiments, disclosed is a computer program product for a processing system comprised of a server to provide data values, the computer program product comprising a computer readable storage medium having computer readable program code embodied therewith, the computer readable program code including computer instructions, where a processor, responsive to executing the computer instructions, performs operations comprising: the server maintaining a cache of objects; the server executing an asynchronous computation to determine the value of an object; returning a value of the object from the cache, in response to a request for the object occurring before the asynchronous computation has determined the value of the object; and returning a value of the object determined by the asynchronous computation, in response to a request for the object occurring after the asynchronous computation has determined the value of the object.

The present invention, according to various embodiments thereof, provides a processing system comprising: a server; memory; a network interface device for communicating with one or more networks; and at least one processor, communicatively coupled with the server, the memory, and the network interface device, the at least one processor, responsive to executing computer instructions, performing operations comprising: the server maintaining a cache of objects in the memory; the server executing an asynchronous computation to determine the value of an object; returning a value of the object from the cache of objects, in response to a request for the object occurring before the asynchronous computation has determined the value of the object; and returning a value of the object determined by the asynchronous computation, in response to a request for the object occurring after the asynchronous computation has determined the value of the object.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

Figure 1:
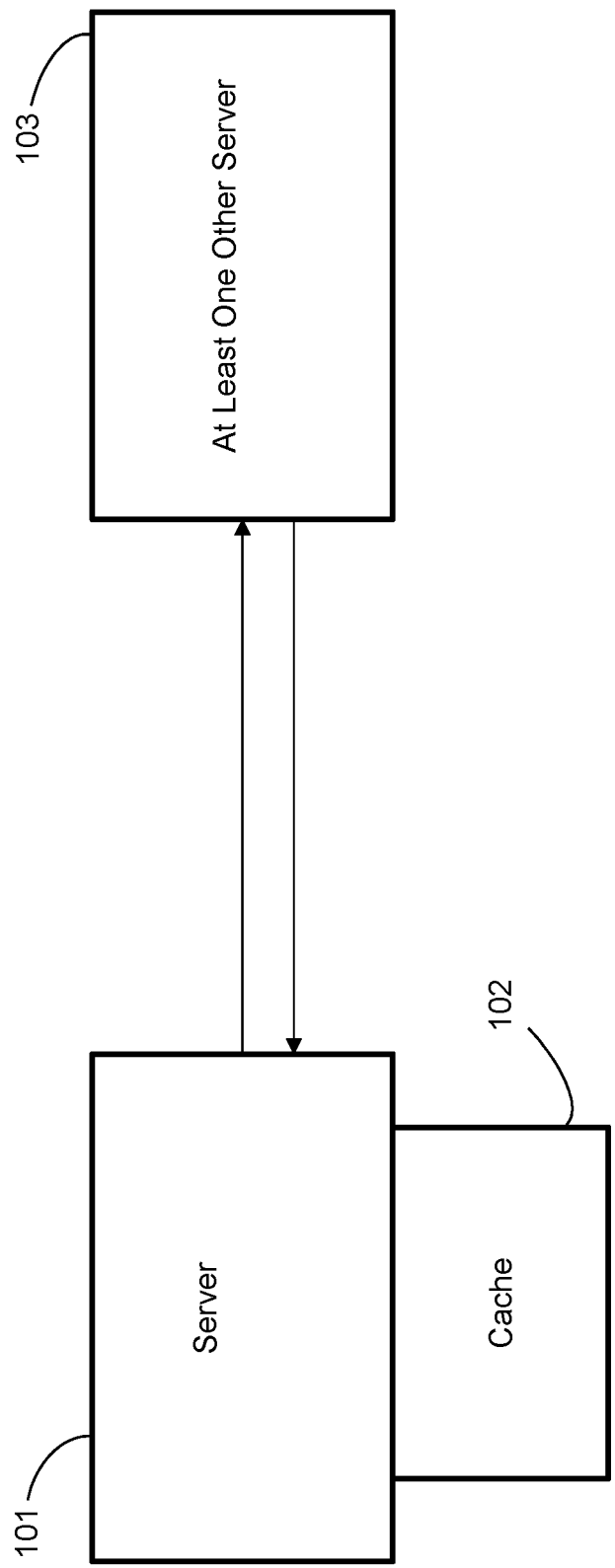
FIG. 1 is a block diagram illustrating an example of a server processing system, according to an embodiment of the present invention.

Various embodiments of the present invention are applicable to caching in a wide variety of environments including cloud environments and non-cloud environments. FIG. 1 shows a server processing system in accordance with the current invention.

A first server 101 is accessing data from at least one other server 103. The at least one other server 103 may comprise one server or multiple servers. It may take considerable time for the first server 101 to query the at least one other server 103. Therefore, the first server 101 contains a local cache 102 for storing data fetched from the at least one other server 103. Information can be retrieved considerably faster from the local cache 102 than from a remote at least one other server 103. The local cache 102 can thus improve performance.

One problem is that data fetched from the local cache 102 may not be current. The present invention provides methods and systems for alleviating this problem.

Figure 2:
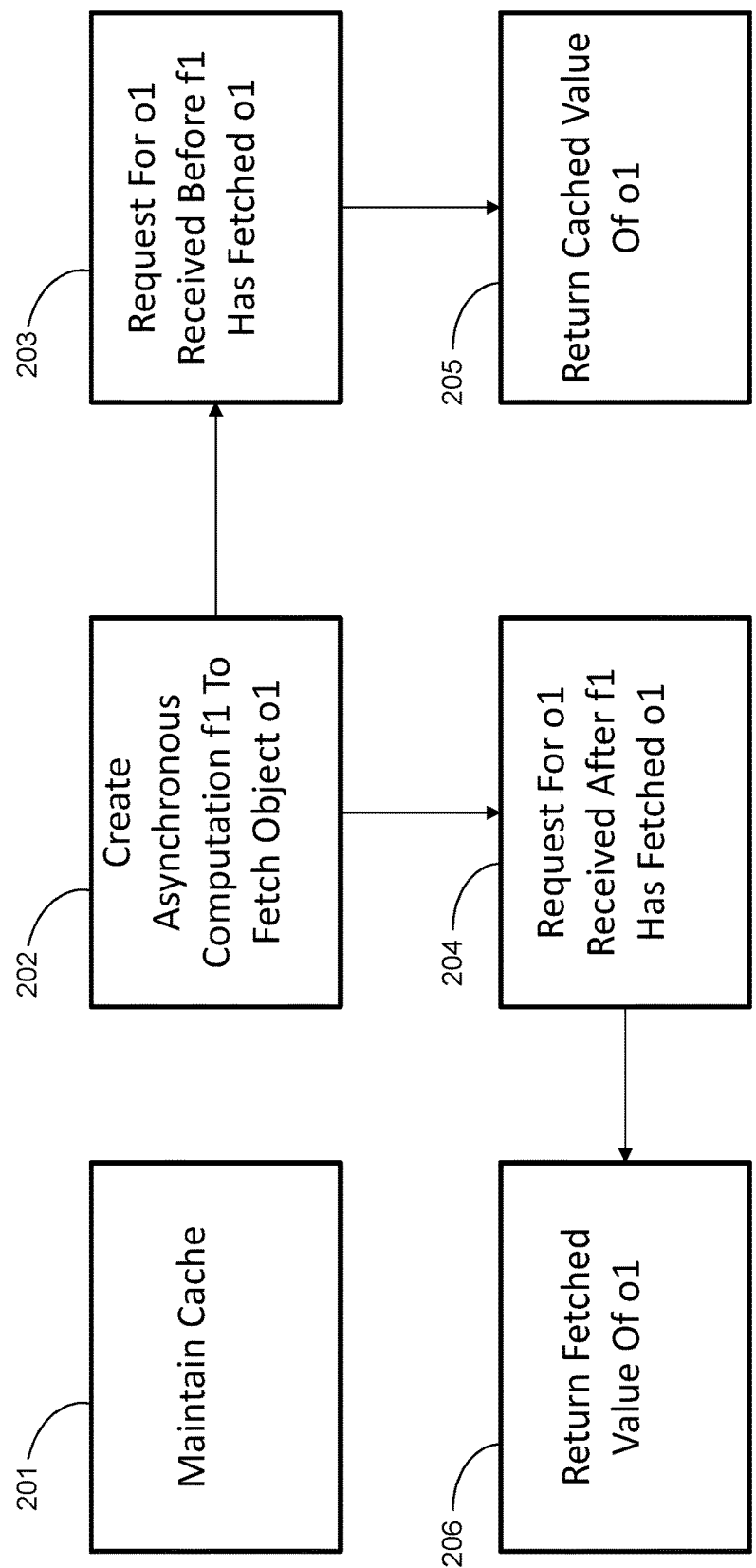
FIG. 2 is a block diagram illustrating an example of a method for asynchronous data store operations, according to an embodiment of the present invention.

FIG. 2 shows an example method for obtaining data from at least one other server 103, in accordance with the invention. The local cache 102, according to this example, is continuously maintained in step 201. The local cache 102 contains data from at least one other server 103. Suppose that object o1 is an important object stored on at least one other server 103 which is needed by the first server 101. In step 202, the first server 101 creates an asynchronous computation f1 to fetch object o1 from the at least one other server 103. An asynchronous computation may be a thread or process which can run in parallel with existing computations and not block them. One example of an asynchronous computation is a future. Futures are used to represent the result of asynchronous computations which may not have finished executing. Several programming languages implement them, such as Java™.

For this example, more functionality is provided by ListenableFuture.

There are several types of events which might trigger the method step 202 to create an asynchronous computation f1 to fetch object o1. For example, a request for object of might trigger the method step 202 to create an asynchronous computation f1 to fetch object o1. The method step 202 might be invoked periodically. For example, the method step 202 might be invoked after a period of time (i.e., a time interval) has elapsed. If data is available on how frequently object o1 changes, this can be used to determine when to invoke the method step 202 to create an asynchronous computation f1 to fetch object o1. If object o1 changes frequently, then it may be desired to invoke the method step 202 frequently. If object o1 changes less frequently, then it may be advisable to invoke the method step 202 less frequently to reduce overhead.

The importance of having current values of object of can also be used in making decisions of how frequently to invoke step 202. If it is important to have current values of object o1, then the method step 202 might be invoked more frequently. If it is less important to have current values of object o1, then the method step 202 might be invoked less frequently.

Now suppose, according to the example, that a request for object o1 is received before asynchronous computation f1 has fetched object of from the at least one other server 103 (Step 203). In this case, in step 205, the value of object o1 from cache 102 is returned, if it exists.

In step 204, according to the example, a request for object of is received after asynchronous computation f1 has fetched object o1 from the at least one other server 103. In this case, in step 206, the value of object o1 fetched from the at least one other server 103 by asynchronous computation f1 is returned.

Once the asynchronous computation f1 has fetched object of from the at least one other server 103, the first server 101 can optionally update the cache 102 with the updated value of object of fetched from the at least one other server 103 by the asynchronous computation f1.

Asynchronous computations such as threads, processes, futures, etc., can also be used to store data on the at least one other server 103. That way, computations will not be blocked waiting for a remote store operation to complete. For example, the first server 101 can invoke a future f2 to store an object o2 on the at least one other server 103. Existing computations can continue to execute before the future f2 completes the store operation.

Once the future f2 has stored object o2 on the at least one other server 103, the first server 101 can optionally update the cache 102 with the value of object o2 stored on the at least one other server 103 by the future f2.

An asynchronous computation for determining the value of an object might have to do sophisticated computations. For example, it might be computationally expensive to compute a value for an object. Determining the value of an object may involve accessing several databases which can consume significant latency.

In some cases, the at least one other server 103 may comprise two or more servers. If the first server 101 makes a request to the at least one other server 103 for object o3, multiple servers comprising the at least one other server 103 may return different values for object o3. In this case, according to the example, an asynchronous computation f3 determining the value of object o3 makes a determination of which value(s) to return for object o3. There are multiple ways that this can be done:

The asynchronous computation f3 can see which values for object o3 appear most frequently. For example, suppose that the asynchronous computation f3 receives three values for object o3: 300, 200, and 200. Since the value 200 appears most frequently, 200 is the value that is returned.

Time stamps, according to various embodiments, can be associated with the values returned from the servers. In this case, the asynchronous computation f3 returns a value with a most recent time stamp.

Below will be discussed, by examples, further details of how futures can be used to implement various embodiments of the invention in the Java™ programming language. Other programming languages with futures can be used as well. In Java™, as an example, a Future represents the result of an asynchronous computation. Methods are provided to check if the computation is complete, to wait for its completion, and to retrieve the result of the computation.

Suppose that objects are referenced by keys. A request is made to fetch a value for an object corresponding to "key1" via a method call:

MultiValue mv1=lookup("key1");

Class MultiValue includes the following fields:

cachedVal: value fetched from the cache 102 (if it exists). The lookup method will not return until the cache lookup has taken place. In some cases, "key1" may not correspond to any value in the cache, in which case cachedVal is set to a not found value.

storeValueFuture: future used to request the value of "key1" from the at least one other server 103. A separate thread is used for this future. The lookup method does not wait for this thread to complete before returning, allowing the main computation to continue executing without blocking.

mv1 has a getFast( ) method for returning a value quickly, and can be implemented using:

```
If (!storeValueFuture.isDone( ) == && (cachedVal. exists( )) then
    return cachedVal.value( );
else
    return storeValueFuture.get( );
```

If the storeValueFuture has not finished executing and a cached value (stored in cachedVal) exists, getFast( ) will return the cached value right away without blocking. After the future has completed, getFast( ) will return the value fetched from the at least one other server 103.

Using this approach, the program can use mv1.cachedVal for the value corresponding to "key1" before storeValueFuture has finished executing. After storeValueFuture has finished executing, the program can use the value returned by storeValueFuture for the value corresponding to "key1". In addition, an error handling method can be provided which is invoked if the lookup operation in the at least one other server 103 fails. If ListenableFutures are used, a callback function in the application can be provided which will execute as soon as storeValueFuture has finished executing.

In some cases, it is desirable to get a value from the at least one other server 103, even if this means waiting for the operation to complete. This can be achieved by invoking mv1.getFromServer( ) which is implemented as:

return storeValueFuture.get( );

Java also has ListenableFutures. ListenableFuture extends the Java Future interface allowing callback computations to be executed after the future has completed execution. Using ListenableFutures, the lookup method can be implemented so that the cache is automatically updated after the asynchronous computation fetching the value of "key1" from the at least one other server 103 has finished executing.

Now, consider a request to store object7 with key "key1" in the at least one other server 103:

future1=dataStore.putAsync("key1", object7);

The computation does not block waiting for the putAsync operation to complete. The computation can thus proceed without blocking. We can determine when the write to the at least one other server 103 has completed via:

future1.isDone( );

which returns true if the write to the at least one other server 103 has completed. If future1 is a ListenableFuture, a callback can be used to update the cache 102 after the write to the at least one other server 103 has completed.

Alternatively, putAsync can cache object7 immediately without waiting for the write to the at least one other server 103 to complete. This is done synchronously, so execution does not proceed until object7 has been cached. putAsync also creates a future to store object7 in the at least one other server 103. This future is then returned by putAsync as future1, and the application program continues executing without waiting for the future to finish storing object7 in the at least one other server 103. If the object corresponding to "key1" is requested before object7 is stored in the at least one other server 103, object7 can be obtained from the cache 102.

An error handling method can be provided which is invoked if storing object7 in the at least one other server 103 fails. If object7 is not successfully stored in the at least one other server 103, the error handling method can be used to retry the store operation.

Example of a Processing System Server Node Operating in a Network

Figure 3:
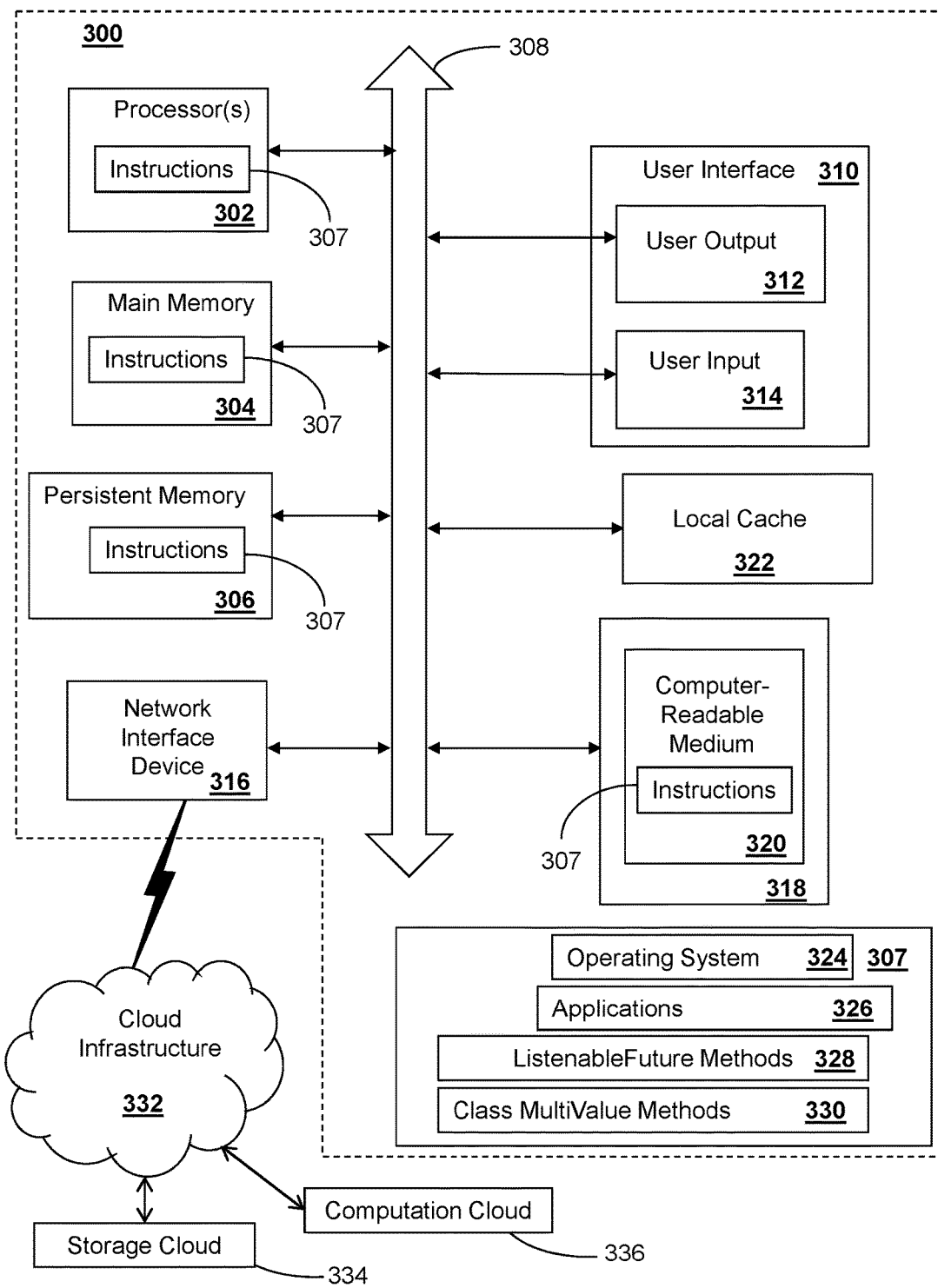
FIG. 3 is a block diagram illustrating an example processing system server node, according to an embodiment of the present invention.

FIG. 3 illustrates an example of a processing system server node 300 (also referred to as a computer system/server or referred to as a server node) suitable for use according to the server processing system example shown in FIG. 1. The server node 300, according to the example, is communicatively coupled with a cloud infrastructure 332 that can include one or more communication networks. The cloud infrastructure 332 is communicatively coupled with a storage cloud 334 (which can include one or more storage servers) and with a computation cloud 336 (which can include one or more computation servers). This simplified example is not intended to suggest any limitation as to the scope of use or function of various example embodiments of the invention described herein.

The server node 300 comprises a computer system/server, which is operational with numerous other general purpose or special purpose computing system environments or configurations. Examples of well-known computing systems, environments, and/or configurations that may be suitable for use with such a computer system/server include, but are not limited to, personal computer systems, server computer systems, thin clients, thick clients, hand-held or laptop devices, multiprocessor systems, microprocessor-based systems, set top boxes, programmable consumer electronics, network personal computers (PCs), minicomputer systems, mainframe computer systems, and distributed cloud computing environments that include any of the above systems and/or devices, and the like.

The computer system/server or server node 300 may be described in the general context of computer system-executable instructions, such as program modules, being executed by a computer system. Generally, program modules may include routines, programs, objects, components, logic, data structures, and so on that perform particular tasks or implement particular abstract data types. A computer system/server may be practiced in distributed cloud computing environments where tasks are performed by remote processing devices that are linked through a communications network. In a distributed cloud computing environment, program modules may be located in both local and remote computer system storage media including memory storage devices.

Referring more particularly to FIG. 3, the following discussion will describe a more detailed view of an example cloud infrastructure server node embodying at least a portion of the server processing system of FIG. 1. According to the example, at least one processor 302 is communicatively coupled with system main memory 304 and persistent memory 306.

A bus architecture 308 facilitates communicative coupling between the at least one processor 302 and the various component elements of the server node 300. The bus 308 represents one or more of any of several types of bus structures, including a memory bus, a peripheral bus, an accelerated graphics port, and/or a processor, or local, bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The system main memory 304, in one embodiment, can include computer system readable media in the form of volatile memory, such as random access memory (RAM) and/or cache memory. By way of example only, a persistent memory storage system 306 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disc-read only memory (CD-ROM) and digital versatile disc-read only memory (DVD-ROM) or other optical media can be provided. In such instances, each can be connected to bus 308 by one or more data media interfaces. As will be further depicted and described below, persistent memory 306 may include at least one program product having a set (e.g., at least one) of program modules that are configured to carry out the functions of various embodiments of the invention.

A program/utility, having a set (at least one) of program modules, may be stored in persistent memory 306 by way of example, and not limitation, as well as an operating system 324, one or more application programs or applications 326, other program modules, and program data. Each of the operating system 324, one or more application programs 326, other program modules, and program data, or some combination thereof, may include an implementation of a networking environment. Program modules generally may carry out the functions and/or methodologies of various embodiments of the invention as described herein.

The at least one processor 302 is communicatively coupled with one or more network interface devices 316 via the bus architecture 308. The network interface device 316 is communicatively coupled, according to various embodiments, with one or more networks operably coupled with a cloud infrastructure 332. The cloud infrastructure 332 includes a storage cloud 334, which comprises one or more storage servers (also referred to as storage server nodes), and a computation cloud 336, which comprises one or more computation servers (also referred to as computation server nodes). The network interface device 316 can communicate with one or more networks such as a local area network (LAN), a general wide area network (WAN), and/or a public network (e.g., the Internet). The network interface device 316 facilitates communication between the server node 300 and other server nodes in the cloud infrastructure 332.

A user interface 310 is communicatively coupled with the at least one processor 302, such as via the bus architecture 308. The user interface 310, according to the present example, includes a user output interface 312 and a user input interface 314. Examples of elements of the user output interface 312 can include a display, a speaker, one or more indicator lights, one or more transducers that generate audible indicators, and a haptic signal generator. Examples of elements of the user input interface 314 can include a keyboard, a keypad, a mouse, a track pad, a touch pad, and a microphone that receives audio signals. The received audio signals, for example, can be converted to electronic digital representation and stored in memory, and optionally can be used with voice recognition software executed by the processor 302 to receive user input data and commands.

A computer readable medium reader/writer device 318 is communicatively coupled with the at least one processor 302. The reader/writer device 318 is communicatively coupled with a computer readable medium 320. The server node 300, according to various embodiments, can typically include a variety of computer readable media 320. Such media may be any available media that is accessible by the computer system/server 300, and it can include any one or more of volatile media, non-volatile media, removable media, and non-removable media.

Computer instructions 307 can be at least partially stored in various locations in the server node 300. For example, at least some of the instructions 307 may be stored in any one or more of the following: in an internal cache memory in the one or more processors 302, in the main memory 304, in the persistent memory 306, and in the computer readable medium 320.

The instructions 307, according to the example, can include computer instructions, data, configuration parameters, and other information that can be used by the at least one processor 302 to perform features and functions of the server node 300. According to the present example, the instructions 307 include an operating system 324, one or more applications 326, a set of ListenableFuture methods 328 and a set of class MutiValue methods 330 as has been discussed above with reference to FIGS. 1 and 2. Additionally, the instructions 307 include server node configuration data.

The at least one processor 302, according to the example, is communicatively coupled with the server cache storage 322 (also referred to as local cache 322), which can store at least a portion of the server node data, networking system and cloud infrastructure messages and data being communicated with the server node 300, and other data, for operation of services and applications coupled with the server node 300. Various functions and features of the present invention, as have been discussed above, may be provided with use of the server node 300.

Example Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
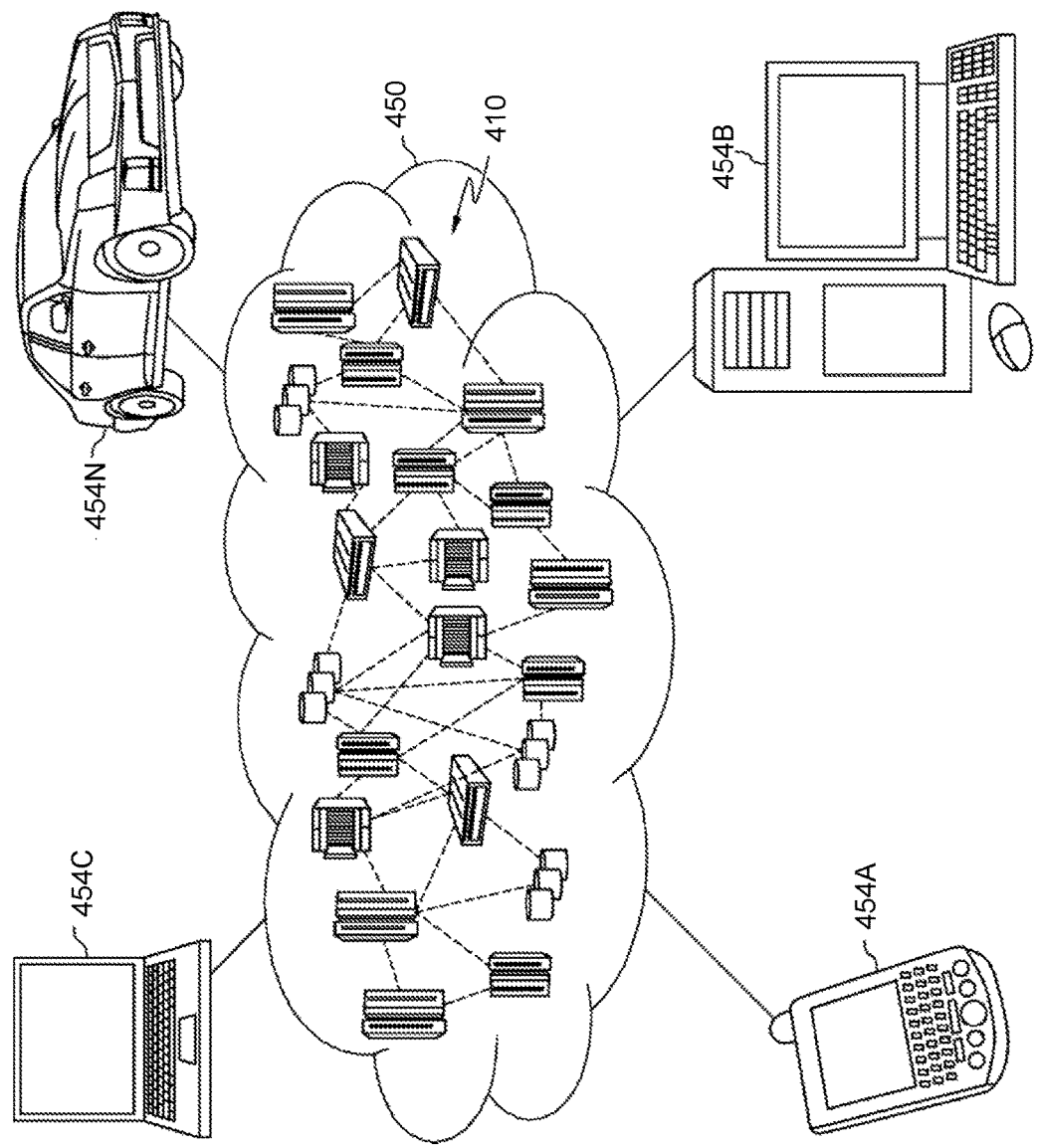
FIG. 4 depicts a cloud computing environment suitable for use with an embodiment of the present invention.

Referring now to FIG. 4, an illustrative cloud computing environment 450 is depicted. As shown, cloud computing environment 450 comprises one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 410 and cloud computing environment 450 can communicate with any type of computerized device over any type of network and/or network addressable connection (e.g., using a web browser).

Figure 5:
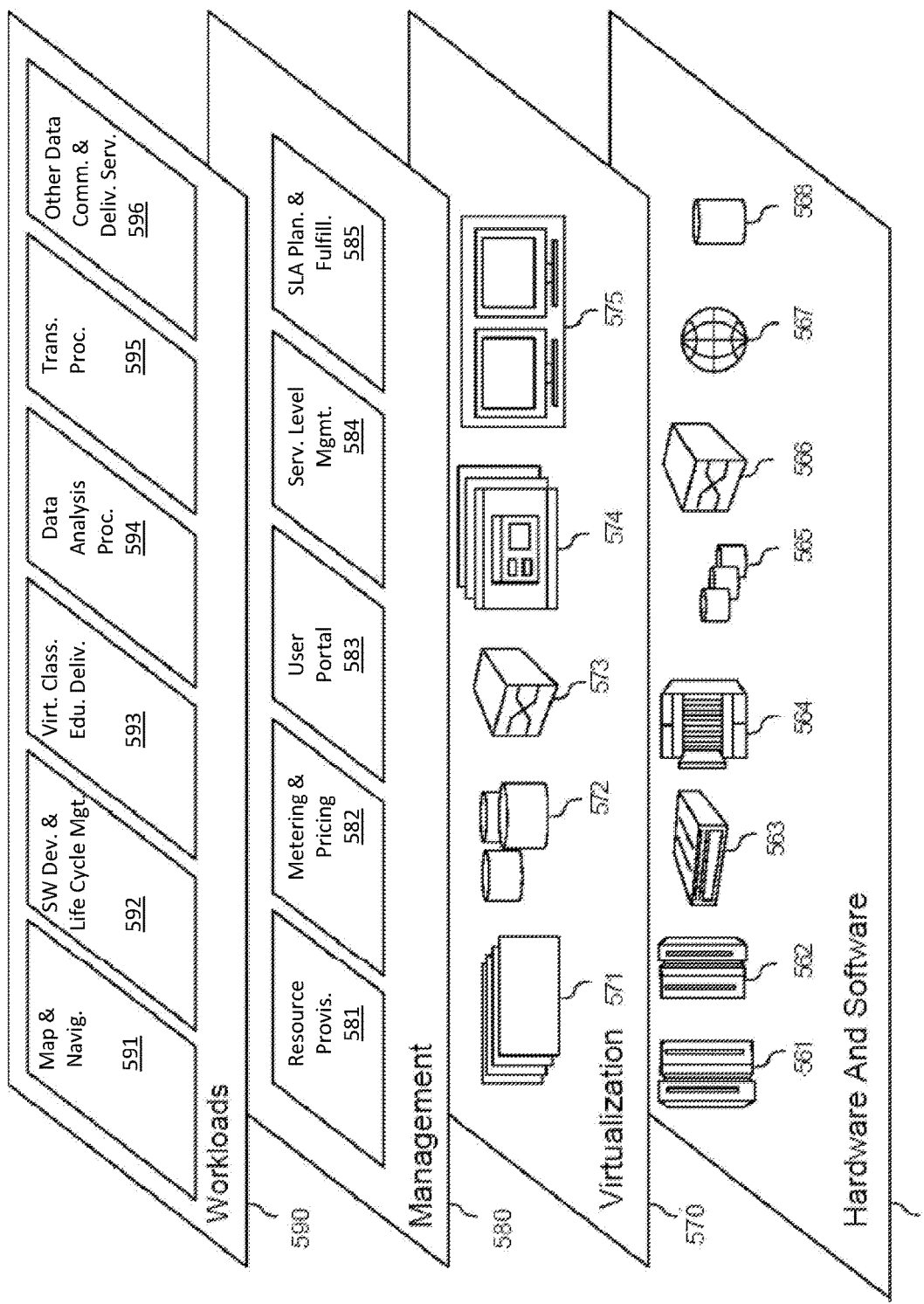
FIG. 5 depicts abstraction model layers according to the cloud computing embodiment of FIG. 4.

Referring now to FIG. 5, a set of functional abstraction layers provided by cloud computing environment 450 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking of resources which are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and other data communication and delivery services 596. Various functions and features of the present invention, as have been discussed above, may be provided with use of a server node 300 communicatively coupled with a cloud infrastructure 332, which can include a storage cloud 334 and/or a computation cloud 336.

NON-LIMITING EXAMPLES

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory "stick", a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk®, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present specification may describe components and functions implemented in the embodiments with reference to particular standards and protocols, the invention is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this invention. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor is illustrated for an information processing system, information processing systems with multiple central processing units (CPUs) or processors can be used equally effectively. Various embodiments of the present invention can further incorporate interfaces that each includes separate, fully programmed microprocessors that are used to off-load processing from the processor. An operating system included in main memory for a processing system may be a suitable multitasking and/or multiprocessing operating system, such as, but not limited to, any of the Linux®, UNIX®, Windows®, and Windows® Server based operating systems. Various embodiments of the present invention are able to use any other suitable operating system. Various embodiments of the present invention utilize architectures, such as an object oriented framework mechanism, that allow instructions of the components of the operating system to be executed on any processor located within an information processing system. Various embodiments of the present invention are able to be adapted to work with any data communications connections including present day analog and/or digital techniques or via a future networking mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The terms "communicatively coupled" or "communicatively coupling" include, but are not limited to, communicating electronic control signals by which one element may direct or control another. The term "configured to" describes hardware, software or a combination of hardware and software that is set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop personal computer (laptop PC), a tablet computer, a smart phone, a mobile phone, a wireless communication device, a personal digital assistant, a workstation, and the like. A processing system may include one or more processing systems or processors. A processing system can be realized in a centralized fashion in one processing system or in a distributed fashion where different elements are spread across several interconnected processing systems.

The corresponding structures, materials, acts, and equivalents of all means or step plus function elements in the claims below are intended to include any structure, material, or act for performing the function in combination with other claimed elements as specifically claimed.

The description of the present application has been presented for purposes of illustration and description, but is not intended to be exhaustive or limited to the invention in the form disclosed. Many modifications and variations will be apparent to those of ordinary skill in the art without departing from the scope of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for a processing system comprised of a server to provide data values, the computer program product comprising a computer readable storage medium having computer readable program code embodied therewith, the computer readable program code including computer instructions, wherein a processor of the server, responsive to executing the computer instructions, performs operations in the processing system comprising:

maintaining a cache of objects communicatively coupled with the server;

executing an asynchronous computation to determine the value of a first object;

returning a value of the first object from the cache of objects, in response to a request for the first object occurring before the asynchronous computation has determined the value of the first object;

returning a value of the first object determined by the asynchronous computation, in response to a request for the first object occurring after the asynchronous computation has determined the value of the first object;

providing a datatype which includes a field for a value and a field for a future; and invoking a program module to lookup at least one data value corresponding to a key which returns an object of the datatype, wherein the field for a value comprises a cached value corresponding to the key and the field for a future comprises a future which asynchronously calculates an updated value corresponding to the key.

2. The computer program product of claim 1 wherein the asynchronous computation comprises at least one future.

3. The computer program product of claim 1 wherein the asynchronous computation comprises at least one process or thread.

4. The computer program product of claim 1, wherein the operations further comprise:

updating the cache of objects with the value of the first object determined by the asynchronous computation, in response to the asynchronous computation determining the value of the first object.

5. The computer program product of claim 1 wherein executing an asynchronous computation occurs in response to a request for the first object.

6. The computer program product of claim 1 wherein executing an asynchronous computation occurs periodically.

7. The computer program product of claim 1 wherein executing an asynchronous computation occurs after a time interval has elapsed.

8. The computer program product of claim 1 wherein executing an asynchronous computation occurs with a frequency correlated with how frequently the first object changes.

9. The computer program product of claim 1 wherein executing an asynchronous computation occurs with a frequency correlated with how important it is to have a current value of the first object.

10. The computer program product of claim 1 wherein the asynchronous computation determines the value of the first object by querying at least one additional server.

11. The computer program product of claim 10 wherein the operations further comprise:
storing an object o2 in the cache of objects;
executing an asynchronous computation c2 to store object o2 on the at least one additional server; and
satisfying the request for object o2 from the cache of objects, in response to receiving a request for object o2 before the asynchronous computation c2 has finished executing.

12. The computer program product of claim 10 wherein said at least one additional server comprises a plurality of servers and the asynchronous computation receives different values from at least two servers of the plurality of servers.

13. The computer program product of claim 12 wherein the asynchronous computation determines the value of the first object from a value, selected from the different values, which is returned most frequently by the at least two servers of the plurality of servers.

14. The computer program product of claim 12 wherein said different values have time stamps associated with them, and wherein the asynchronous computation determines the value of the first object based on the time stamps.

15. The computer program product of claim 10 wherein the operations further comprise:
executing an asynchronous computation c2 to store an object o2 on the at least one additional server.

16. The computer program product of claim 15 wherein the operations further comprise:
updating the cache of objects with the value of object o2, in response to the asynchronous computation c2 storing object o2 on the at least one additional server.

17. The computer program product of claim 15 wherein the asynchronous computation c2 includes an error handling method, and wherein the operations further comprise:
using the error handling method to retry storing object o2 on the at least one additional server, in response to the asynchronous computation c2 failing to store object o2.

18. The computer program product of claim 1, wherein the processor, in response to executing the computer instructions, determines if a future associated with a second object of the datatype has finished executing, and wherein the operations further comprise:
returning a value produced by the future associated with the second object, in response to the future associated with the second object having finished executing; and
returning a value associated with the second object, in response to the future associated with the second object not having finished executing.

19. The computer program product of claim 1 wherein said program module comprises a method or function to lookup the at least one data value.

20. A processing system comprising:
a server including memory, a network interface device for communicating with one or more networks, and at least one processor, communicatively coupled with the memory and the network interface device,
wherein the at least one processor, responsive to executing computer instructions, performs operations comprising:
maintaining a cache of objects communicatively coupled with the server;
executing an asynchronous computation to determine the value of a first object;
returning a value of the first object from the cache of objects, in response to a request for the first object occurring before the asynchronous computation has determined the value of the first object;
returning a value of the first object determined by the asynchronous computation, in response to a request for the first object occurring after the asynchronous computation has determined the value of the first object;
providing a datatype which includes a field for a value and a field for a future; and
invoking a program module to lookup at least one data value corresponding to a key which returns an object of the datatype wherein the field for a value comprises a cached value corresponding to the key and the field for a future comprises a future which asynchronously calculates an updated value corresponding to the key.

21. The processing system of claim 20, wherein the executing the asynchronous computation occurs with a frequency correlated with how important it is to have a current value of the first object.

22. The processing system of claim 20, wherein the operations further comprise:
storing an object o2 in the cache of objects;
executing an asynchronous computation c2 to store object o2 on the at least one additional server; and
satisfying a request for object o2 from the cache of objects, in response to receiving the request for object o2 before the asynchronous computation c2 has finished executing.

23. The processing system of claim 20, wherein the asynchronous computation determines the value of the first object by querying at least one additional server;
wherein the at least one additional server comprises a plurality of servers and the asynchronous computation receives different values from at least two servers of the plurality of servers; and
wherein said asynchronous computation determines the value of the first object from a value selected from the different values, which is returned most frequently by the at least two servers of the plurality of servers.

24. The processing system of claim 20, wherein the asynchronous computation determines the value of the first object by querying at least one additional server;
wherein the at least one additional server comprises a plurality of servers and the asynchronous computation receives different values from at least two servers of the plurality of servers; and wherein said different values have time stamps associated with them, and wherein the asynchronous computation determines the value of the first object based on the time stamps.

25. The processing system of claim 20, wherein the operations further comprise:
the asynchronous computation determining the value of the first object by querying at least one additional server; and
the server executing an asynchronous computation c2 to store an object o2 on the at least one additional server.

* * * * *